US010713908B2

(12) United States Patent
Yokoyama et al.

(10) Patent No.: US 10,713,908 B2
(45) Date of Patent: Jul. 14, 2020

(54) CONTENT PROVIDING SYSTEM, CONTROL APPARATUS, AND RECEPTION APPARATUS

(71) Applicant: SONY CORPORATION, Tokyo (JP)

(72) Inventors: Ryo Yokoyama, Tokyo (JP); Ikuo Yamano, Tokyo (JP); Osamu Ito, Tokyo (JP); Yosuke Matsuzaki, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/328,785

(22) PCT Filed: Aug. 22, 2017

(86) PCT No.: PCT/JP2017/029905
§ 371 (c)(1),
(2) Date: Feb. 27, 2019

(87) PCT Pub. No.: WO2018/061528
PCT Pub. Date: Apr. 5, 2018

(65) Prior Publication Data
US 2019/0228619 A1 Jul. 25, 2019

(30) Foreign Application Priority Data
Sep. 30, 2016 (JP) ................. 2016-194364

(51) Int. Cl.
*H04B 3/36* (2006.01)
*G08B 6/00* (2006.01)
(Continued)

(52) U.S. Cl.
CPC ............... *G08B 6/00* (2013.01); *G06F 3/016* (2013.01); *G06F 3/16* (2013.01); *G06F 13/00* (2013.01); *H04W 4/08* (2013.01)

(58) Field of Classification Search
None
See application file for complete search history.

(56) References Cited

U.S. PATENT DOCUMENTS

2011/0128134 A1* 6/2011 Lee .................... G08B 6/00
340/407.2
2012/0128315 A1* 5/2012 Asami ................. G06F 3/147
386/201

(Continued)

FOREIGN PATENT DOCUMENTS

CN 102473082 A 5/2012
CN 104049735 A 9/2014
(Continued)

*Primary Examiner* — Julie B Lieu
(74) *Attorney, Agent, or Firm* — Chip Law Group

(57) ABSTRACT

To provide a content providing system preferably providing a plurality of users with content. A content providing system according to the present technology includes a transmission apparatus, a control apparatus, and a plurality of reception apparatuses. The transmission apparatus transmits a trigger signal by broadcasting the trigger signal. The control apparatus controls the transmission apparatus. Each of the plurality of reception apparatuses includes a signal-reception part that receives the trigger signal, a storage part that stores content, a content presenting part that presents the content to a user, and a control part that controls the content presenting part on the basis of the trigger signal.

11 Claims, 12 Drawing Sheets

(51) Int. Cl.
*G06F 3/16* (2006.01)
*H04W 4/08* (2009.01)
*G06F 13/00* (2006.01)
*G06F 3/01* (2006.01)

(56) References Cited

U.S. PATENT DOCUMENTS

2014/0266644 A1* 9/2014 Heubel ................ G06F 3/0421
340/407.1
2015/0325090 A1 11/2015 Heubel
2016/0234662 A1 8/2016 Heubel

FOREIGN PATENT DOCUMENTS

| EP | 2461582 A1 | 6/2012 |
| EP | 2779706 A1 | 9/2014 |
| JP | 2005-203948 A | 7/2005 |
| JP | 2011-030019 A | 2/2011 |
| JP | 2014-154897 A | 8/2014 |
| JP | 2014-179984 A | 9/2014 |
| KR | 10-2014-0113390 A | 9/2014 |
| WO | 2011/013457 A1 | 2/2011 |

* cited by examiner

CONTENT PROVIDING SYSTEM, CONTROL APPARATUS, AND RECEPTION APPARATUS

CROSS REFERENCE TO RELATED APPLICATIONS

This application is a U.S. National Phase of International Patent Application No. PCT/JP2017/029905 filed on Aug. 22, 2017, which claims priority benefit of Japanese Patent Application No. JP 2016-194364 filed in the Japan Patent Office on Sep. 30, 2016. Each of the above-referenced applications is hereby incorporated herein by reference in its entirety.

TECHNICAL FIELD

The present technology relates to a content providing system, a control apparatus, and a reception apparatus capable of providing a plurality of users with content.

BACKGROUND ART

In recent years, a new content-presenting method of presenting a haptic feedback depending on an image and sound attracts interest. For example, in such a method, each of users has a haptic-feedback presenting device, and a control apparatus that reproduces an image or the like instructs each of the haptic-feedback presenting devices of a presenting timing of a haptic feedback. As a result, the haptic feedback may be presented to each of the users depending on progress of the image and the sound.

In the past, two-way communication such as WiFi was often used as communication between apparatuses (See Patent Literature 1), and by two-way communication, a control apparatus is capable of instructing a haptic-feedback presenting device of a presenting timing of a haptic feedback.

CITATION LIST

Non-Patent Literature

Patent Literature 1: Japanese Patent Application Laid-open No. 2011-59821

Disclosure of Invention

Technical Problem

However, in a case that communication between a control apparatus and a haptic-feedback presenting device is performed by two-way communication, establishing communication between the control apparatus and each of the haptic-feedback presenting devices is necessary, and a load of a system is larger as the number of the haptic-feedback presenting devices is larger. Moreover, in the two-way communication, the control apparatus and each of the haptic-feedback presenting devices perform the communication in order. As a result, presenting timings of a haptic feedback of the haptic-feedback presenting devices are different from each other.

In view of the above-mentioned circumstances, it is an object of the present technology to provide a content providing system that preferably provides a plurality of users with content.

Solution to Problem

In order to attain the object, a content providing system according to an embodiment of the present technology includes a transmission apparatus, a control apparatus, and a plurality of reception apparatuses.

The transmission apparatus transmits a trigger signal by broadcasting the trigger signal.

The control apparatus controls the transmission apparatus.

Each of the plurality of reception apparatuses includes a signal-reception part that receives the trigger signal, a storage part that stores content, a content presenting part that presents the content to a user, and a control part that controls the content presenting part on the basis of the trigger signal.

According to the structure, the trigger signal is transmitted by broadcasting the trigger signal and received by the reception apparatus, and as a result, the content stored in the reception apparatus is presented to the user. Due to broadcasting, although the number of the reception apparatuses is large, a system load is not produced. Moreover, the content is stored in the storage part in advance, and as a result, the amount of transmitted information may be smaller compared to a case that the content is transmitted from the transmission apparatus to the reception apparatus.

The control apparatus may control the transmission apparatus to transmit, at a first time point, a first trigger signal for starting reproduction of the content at a first reproduction time point, and to transmit, at a second time point, a second trigger signal for starting reproduction of the content at a second reproduction time point, and a time difference between the first reproduction time point and the second reproduction time point may be the same as a time difference between the first time point and the second time point.

According to the structure, in a case that the reception apparatus may not receive the first trigger signal but may receive the second trigger signal, reproduction of the content is started at the second reproduction time point. The time difference between the first reproduction time point and the second reproduction time point is the same as the time difference between the first time point and the second time point. As a result, the reproduction time point of the content of the reception apparatus that receives the first trigger signal and the reproduction time point of the content of the reception apparatus that receives the second trigger signal coincide with each other, and synchronization between the plurality of reception apparatuses may be realized.

The content may be haptic-feedback content, and
the control apparatus may control the transmission apparatus to provide the user with at least one of image content or sound content, and to synchronize the haptic-feedback content with at least one of the image content or the sound content.

According to the structure, the haptic-feedback content synchronized with at least one of the image content or the sound content may be provided to the user.

The transmission apparatus may transmit the trigger signal by radiation of an electromagnetic wave.

The transmission apparatus may transmit the trigger signal by radiation of an infrared ray.

The content providing system may include a plurality of transmission apparatuses, each of the plurality of transmission apparatuses transmitting the trigger signal by broadcasting the trigger signal, and the control apparatus may control the plurality of transmission apparatuses such that the plurality of transmission apparatuses transmit the trigger signals at different time points.

According to the structure, the trigger signals between the plurality of transmission apparatuses may be prevented from interfering with each other.

The plurality of transmission apparatuses may include a first transmission apparatus and a second transmission apparatus, the control apparatus may control the first transmission apparatus to transmit, at a first time point, a first trigger signal for starting reproduction of the content at a first reproduction time point, and may control the second transmission apparatus to transmit, at a second time point, a second trigger signal for starting reproduction of the content at a second reproduction time point, and a time difference between the first reproduction time point and the second reproduction time point may be the same as a time difference between the first time point and the second time point.

According to the structure, not only the trigger signals between the plurality of transmission apparatuses may be prevented from interfering with each other, but synchronization between the plurality of reception apparatuses may also be realized.

Each of the plurality of reception apparatuses may include a plurality of content presenting parts, the content may include operation timings of the plurality of content presenting parts, respectively, and the control part may control the plurality of content presenting parts on the basis of the trigger signal.

According to the structure, the content includes the operation timings of the plurality of content presenting parts respectively, and the plurality of content presenting parts may be operated at different operation timings. In the present system, the content is stored in the storage part in advance, and as a result, although the number of the content presenting parts is large, the content presenting parts may be easily supported.

In order to attain the above-mentioned object, a control apparatus according to an embodiment of the present technology controls a transmission apparatus that transmits a trigger signal by broadcasting the trigger signal to a plurality of reception apparatuses, each of the plurality of reception apparatuses including a signal-reception part that receives the trigger signal, a storage part that stores content, a content presenting part that presents the content to a user, and a control part that controls the content presenting part on the basis of the trigger signal.

In order to attain the above-mentioned object, a reception apparatus according to an embodiment of the present technology includes a signal-reception part, a storage part, a content presenting part, and a control part.

The signal-reception part receives a trigger signal transmitted by broadcasting the trigger signal.

The storage part stores content.

The content presenting part presents the content to a user.

The control part controls the content presenting part on the basis of the trigger signal.

Advantageous Effects of Invention

As described above, according to the present technology, a content providing system preferably providing a plurality of users with content may be provided. Note that the effects described above are not limitative, but any effect described in the present disclosure may be produced.

MODE(S) FOR CARRYING OUT THE INVENTION

[Configuration of Content Providing System]

Figure 1:
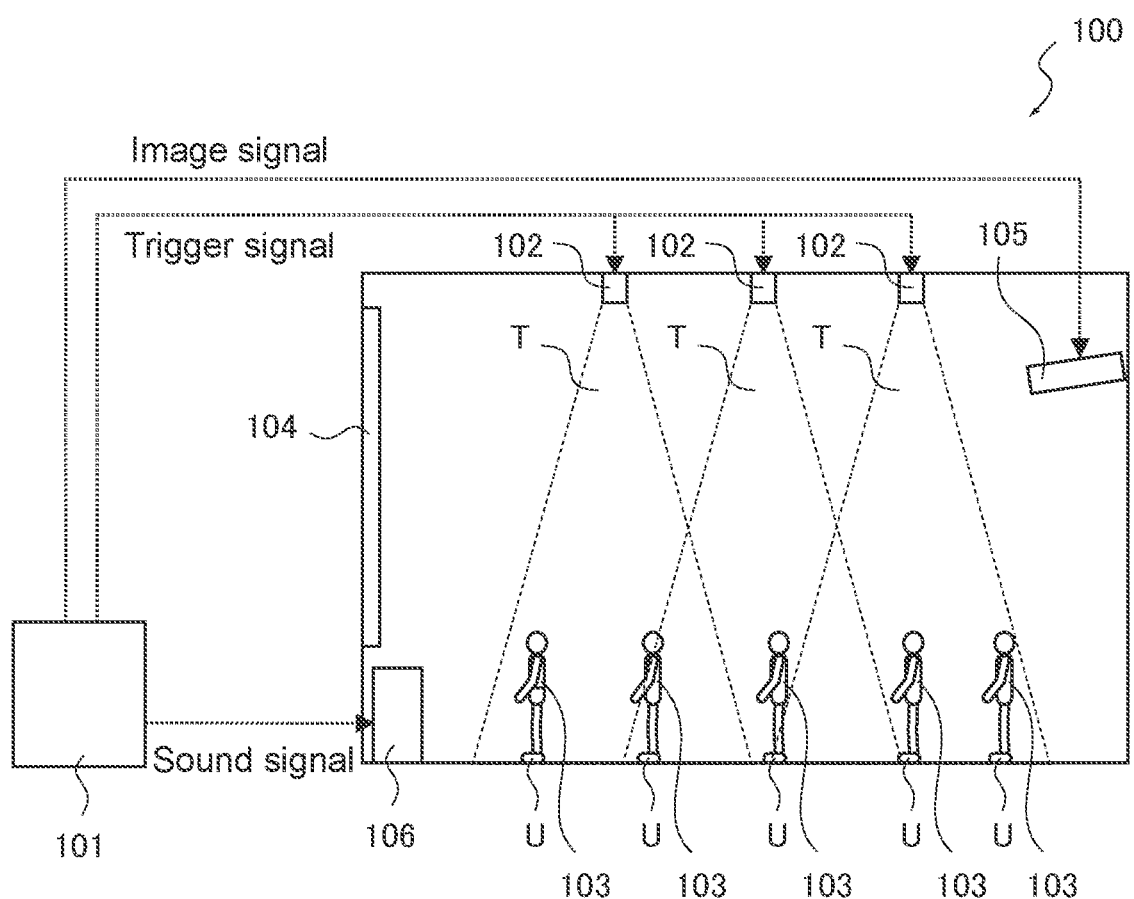
FIG. 1 A diagram schematically showing a content providing system according to an embodiment of the present technology.
Figure 2:
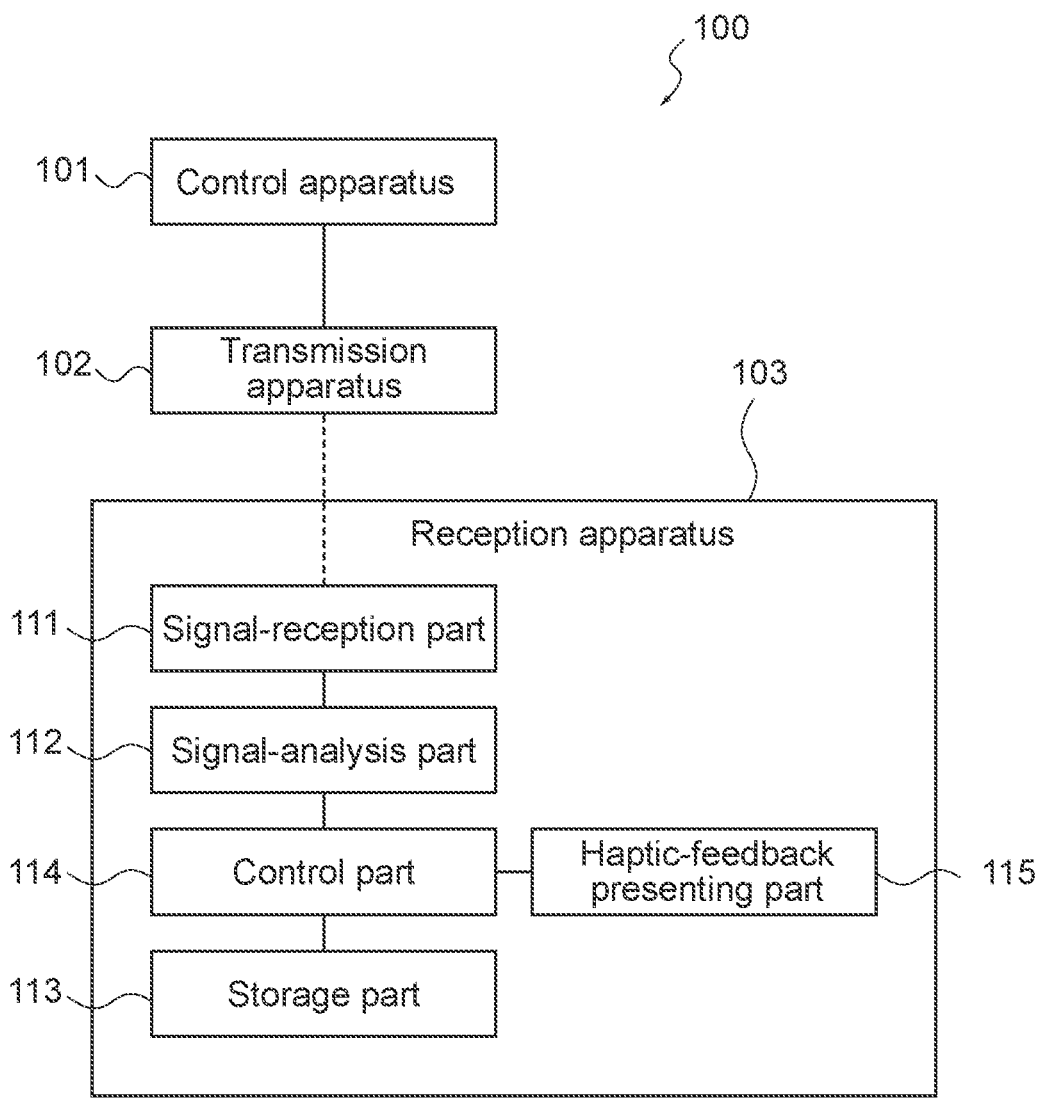
FIG. 2 A block diagram showing the content providing system.

A content providing system according to the present embodiment will be described. FIG. 1 is a diagram schematically showing a content providing system 100 according to the present embodiment, and FIG. 2 is a block diagram showing the content providing system 100.

As shown in FIG. 1, the content providing system 100 includes a control apparatus 101, transmission apparatuses 102, reception apparatuses 103, a screen 104, a projector 105, and a speaker 106. In FIG. 1, each of users U wears the reception apparatus 103.

Figure 12:
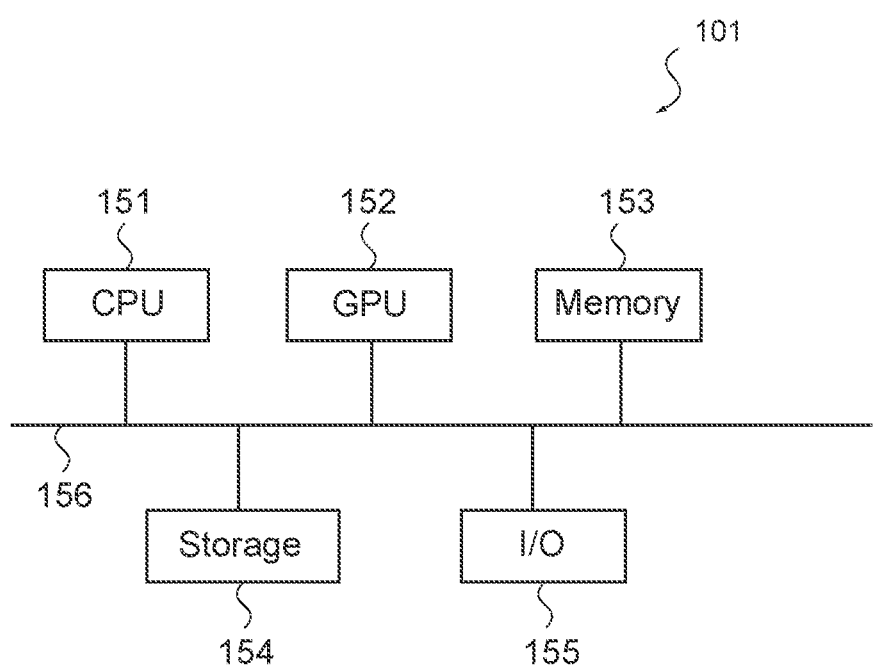
FIG. 12 A block diagram showing a hardware configuration of a control apparatus included in the content providing system.

As shown in FIG. 12, the control apparatus 101 includes a processing part (circuit or the like including a processor and a memory). The control apparatus 101 is connected to the transmission apparatuses 102, the projector 105, and the speaker 106, and controls the transmission apparatuses 102, the projector 105, and the speaker 106. Specifically, the processing part of the control apparatus 101 generates trigger signals, and supplies the trigger signals to the transmission apparatuses 102. Each of the trigger signals is a signal indicating a reproduction-start timing of content in the reception apparatus 103 described below. Moreover, the processing part of the control apparatus 101 supplies an image signal to a projector 10, and supplies a sound signal to the speaker 106. The control apparatus 101 is a personal computer, for example.

Each of the transmission apparatuses 102 transmits each of the trigger signals supplied from the processing part of the control apparatus 101 by broadcasting each of the trigger signals. The trigger signals T transmitted from the transmission apparatuses 102 are shown in FIG. 1. Each of the transmission apparatuses 102 may be an electromagnetic-wave radiation apparatus capable of radiating an electromagnetic wave as the trigger signal. The electromagnetic wave is an infrared ray, visible light, a radio wave, or the like, for example. As shown in FIG. 1, the plurality of transmission apparatuses 102 may be provided. Alternatively, only the one transmission apparatus 102 may be provided. Each of the transmission apparatuses 102 includes a transmission circuit and a radiation apparatus. The transmission circuit is a modulation circuit or a circuit including a D/A converter, for example. The radiation apparatus is an infrared-ray light-emitting diode in a case that an infrared ray is radiated, and the radiation apparatus is a transmission antenna in a case that a radio wave is radiated, for example.

Each of the reception apparatuses 103 receives the trigger signals transmitted from the transmission apparatuses 102, and presents the content to each of the users. As shown in FIG. 2, the reception apparatus 103 includes a signal-reception part 111, a signal-analysis part 112, a storage part 113, a control part 114, and a haptic-feedback presenting part 115.

Figure 3:
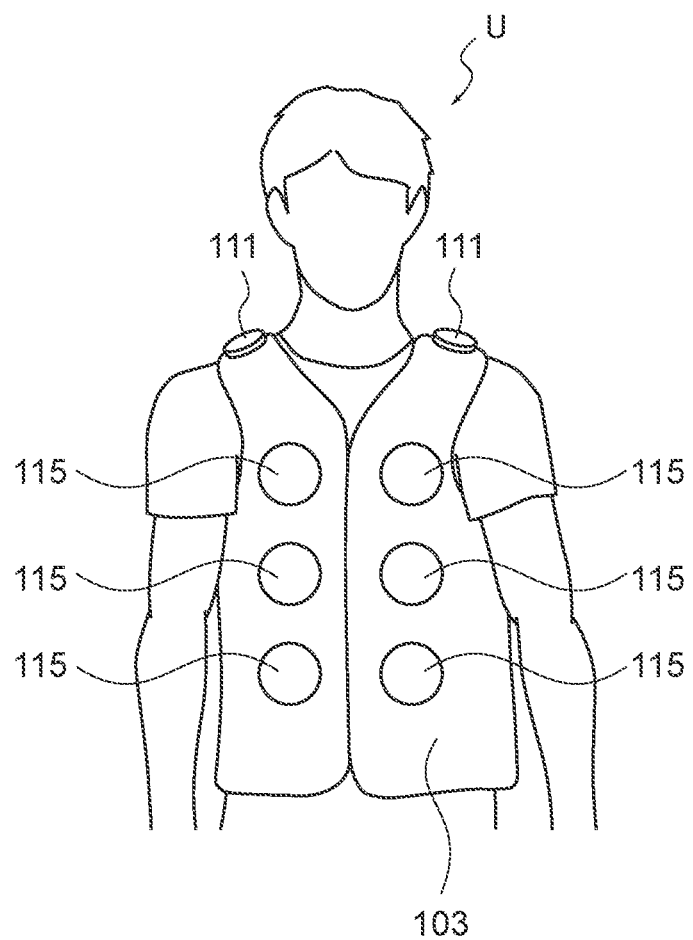
FIG. 3 A diagram schematically showing a reception apparatus included in the content providing system.

FIG. 3 is a diagram schematically showing the reception apparatus 103. As shown in FIG. 3, the reception apparatus 103 may be a haptic jacket including the signal-reception parts 111 and the plurality of haptic-feedback presenting parts 115. The number and arrangement of the signal-reception parts 111 and the haptic-feedback presenting parts 115 are not particularly limited. Note that the reception apparatus 103 is not limited to the haptic jacket, and may be an apparatus such as an HMD (Head Mounted Display) that the user may wear.

The signal-reception part 111 receives the trigger signal transmitted from the transmission apparatus 102. The signal-reception part 111 may be an infrared-ray sensor, for example. As shown in FIG. 3, the signal-reception part 111 is arranged on a position such as on shoulders of the user such that the trigger signal is reliably received.

The signal-analysis part 112 analyzes the trigger signal received by the signal-reception part 111, and supplies an analysis result thereof to the control part 114. The signal-analysis part 112 includes various processors or the like, and one or a plurality of circuits.

Figure 4:
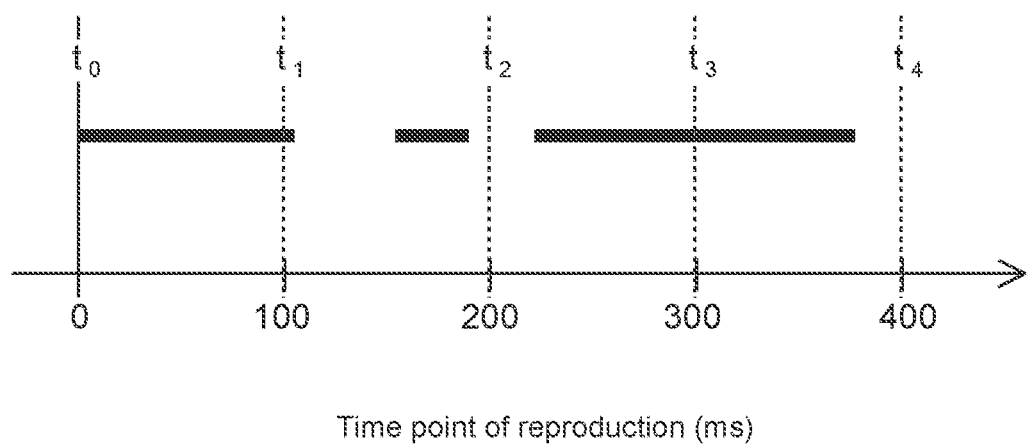
FIG. 4 An example of haptic-feedback content stored in the reception apparatus included in the content providing system.

The storage part 113 stores haptic-feedback content provided to the user. FIG. 4 is an example of the haptic-feedback content that the storage part 113 stores, and a graph showing time points of reproduction and haptic-feedback presenting time (in FIG. 4, black lines). The haptic-feedback presenting time is time in which a haptic feedback is presented to the user. The haptic feedback is, for example, an oscillation. However, the haptic feedback may also be heat. Moreover, the haptic-feedback content may include information such as an intensity of the oscillation or a heating temperature depending on the reproduction time point. The storage part 113 is a nonvolatile memory such as a flash memory, for example.

The control part 114 reads the haptic-feedback content stored in the storage part 113, and determines the reproduction time point of the haptic-feedback content on the basis of the analysis result of the trigger signal supplied from the signal-analysis part 112. The control part 114 instructs the haptic-feedback presenting part 115 to reproduce the haptic-feedback content at the determined reproduction time point. The detail of thereof will be described below. The control part 114 includes various processors or the like, and one or a plurality of circuits.

The haptic-feedback presenting part 115 is controlled by the control part 114 to present the haptic feedback to the user. The haptic-feedback presenting part 115 may be an oscillation-production mechanism such as an eccentric motor or an actuator, a heating mechanism, or the like that may present a haptic feedback to the user.

[Operation of Content Providing System]

The processing part of the control apparatus 101 starts providing the content, supplies the image signal to the projector 105, and supplies the sound signal to the speaker 106. Due to this, an image is projected on the screen 104, and sound is reproduced from the speaker 106.

The processing part of the control apparatus 101 generates the trigger signals at the same time as start of reproduction of the image and the sound or during reproduction of the image and the sound, and supplies the trigger signals to the transmission apparatuses 102. The processing part of the control apparatus 101 may generate the trigger signals when a moving image is started and at intervals of predetermined time from start of reproduction in a case that the provided content is a moving image. Moreover, in a case that the provided content is a game or the like, the processing part of the control apparatus 101 may generate the trigger signals according to a particular scene (for example, explosion scene). The processing part of the control apparatus 101 may synchronize the trigger signals with at least one of the image or the sound. When the trigger signals are supplied, the transmission apparatuses 102 transmit the trigger signals by radiation of an infrared ray or the like.

When the signal-reception part 111 of the reception apparatus 103 receives the trigger signal, the control part 114 reads the haptic-feedback content stored in the storage part 113 according to the analysis result supplied from the signal-analysis part 112, and supplies a control signal to the haptic-feedback presenting part 115. The haptic-feedback presenting part 115 produces the oscillation or the like according to the control signal supplied from the control part 114, and presents the haptic feedback to the user.

Each of the reception apparatuses 103 that each of the users wears operates similarly, and the haptic feedbacks are presented to the plurality of users at the same timing. In FIG. 4, for example, in a case that a reproduction time point to is included in the trigger signal, reproduction of the haptic-feedback content is started from the reproduction position to in each of the reception apparatuses 103 that receives the trigger signal.

In this case, it is not necessary for the transmission apparatus 102 to establish two-way communication between the transmission apparatus 102 and each of the reception apparatuses 103 respectively. As a result, regardless of the number of the reception apparatuses 103, loads are not produced in the transmission apparatus 102 and the control apparatus 101. Moreover, in a case that the two-way communication is established, synchronization lags are produced by performing communication between the transmission apparatus and each of the reception apparatuses in order. However, such synchronization lags are also not produced. Thus, the content providing system 100 may also easily support many users (for example, 500 users).

[About Reproduction Seek]

As described above, the processing part of the control apparatus 101 supplies the trigger signals to the transmission apparatuses 102, and makes the transmission apparatuses 102 transmit the trigger signals to the reception apparatuses 103. Here, the processing part of the control apparatus 101 may make the transmission apparatuses 102 transmit the trigger signals as described below.

Figure 5:
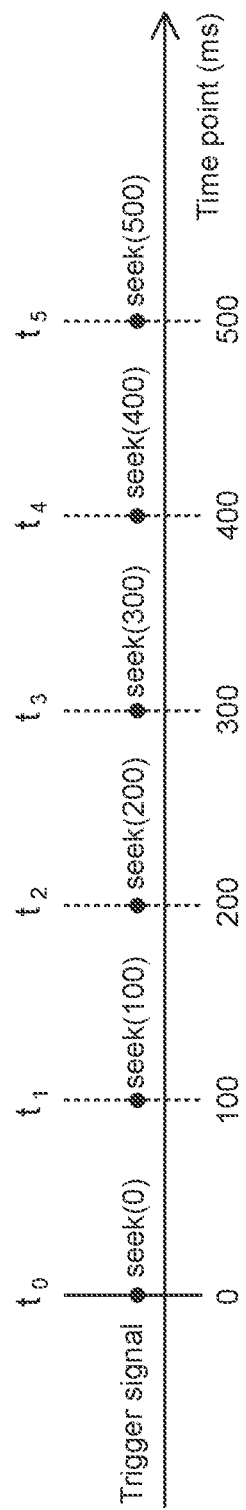
FIG. 5 An example of trigger signals transmitted from a transmission apparatus included in the content providing system.

FIG. 5 is a diagram schematically showing an example of transmission time points of the trigger signals and reproduction time points included in the trigger signals. As shown in FIG. 5, the processing part of the control apparatus 101 makes the transmission apparatus 102 to transmit the trigger signal $t_0$ at the time point 0 ms, and to transmit the trigger signal $t_1$ at the time point 100 ms. Similarly to the above, the processing part of the control apparatus 101 makes the transmission apparatus 102 to transmit the trigger signal every 100 ms.

The trigger signal $t_0$ includes the seek 0 ms, that is, an instruction to start reproduction at a reproduction-start time point of the haptic-feedback content (0 ms) (See FIG. 4). The trigger signal $t_1$ includes the seek 100 ms, that is, an instruction to start reproduction at a reproduction position after 100 ms from the reproduction-start time point (0 ms) (See FIG. 4). Similarly to the above, each of the trigger signals includes the same seek position as each of the transmission time points of the trigger signals transmitted from the transmission apparatus 102. Note that a transmission interval of the trigger signals is not limited to 100 ms, and may be changed appropriately.

In this manner, the trigger signals are transmitted from the transmission apparatus 102 every predetermined time (here, 100 ms). The reception apparatus 103 receives the trigger signals. However, the trigger signals may not be received due to a positional relation, an angle, or the like between the reception apparatus 103 and the transmission apparatus 102. Even in this case, the trigger signals are transmitted from the transmission apparatus 102 every predetermined time, and after all, the trigger signals may be received.

In the reception apparatus 103, when the signal-reception part 111 receives the trigger signals, the signal-analysis part 112 analyzes the seek positions included in the trigger signals, and supplies the seek positions to the control part 114. The control part 114 starts reproduction of the haptic-feedback content from each of the seek positions included in the trigger signals. For example, in a case that the reception apparatus 103 may not receive the trigger signal $t_0$ but receive the trigger signal $t_1$ (See FIG. 4), the control part 114 starts reproduction of the haptic-feedback content at the seek 100 ms, that is, at the reproduction time point after 100 ms from the reproduction-start time point of the haptic-feedback content. Moreover, once the control part 114 receives the trigger signal, the control part 114 ignores the trigger signals that are received since that time.

Due to this, although the reception apparatus 103 may not receive the one trigger signal, the reception apparatus 103 may receive the next trigger signal. Moreover, because the next trigger signal includes the same seek position as the transmission time point of the one trigger signal, delay in receiving the trigger signal is solved by seeking the reproduction time point, and a reproduction timing of the haptic-feedback content becomes the same as the reproduction timing of the haptic-feedback content of the reception apparatus 103 that the other user wears.

Note that the seek position included in each of the trigger signals may be different from the transmission time point of the trigger signal. For example, an instruction of the seek 200 ms may be included in the trigger signal transmitted at the time point 100 ms, and an instruction of the seek 300 ms may be included in the trigger signal transmitted at the time point 200 ms. In this manner, in a case that a time difference between the time points at which the trigger signals are transmitted is the same as a time difference between the seek positions, the reproduction timing of the haptic-feedback content may be the same as the reproduction timing of the haptic-feedback content of the reception apparatus 103 that the other user wears.

[About Transmission Timing of Transmission Apparatus]

The content providing system 100 may include the one transmission apparatus 102, and as shown in FIG. 1, may also include the plurality of transmission apparatuses 102. In a case that the content providing system 100 includes the plurality of transmission apparatuses 102, the processing part of the control apparatus 101 may control the transmission apparatuses 102 as described below.

Figure 6:
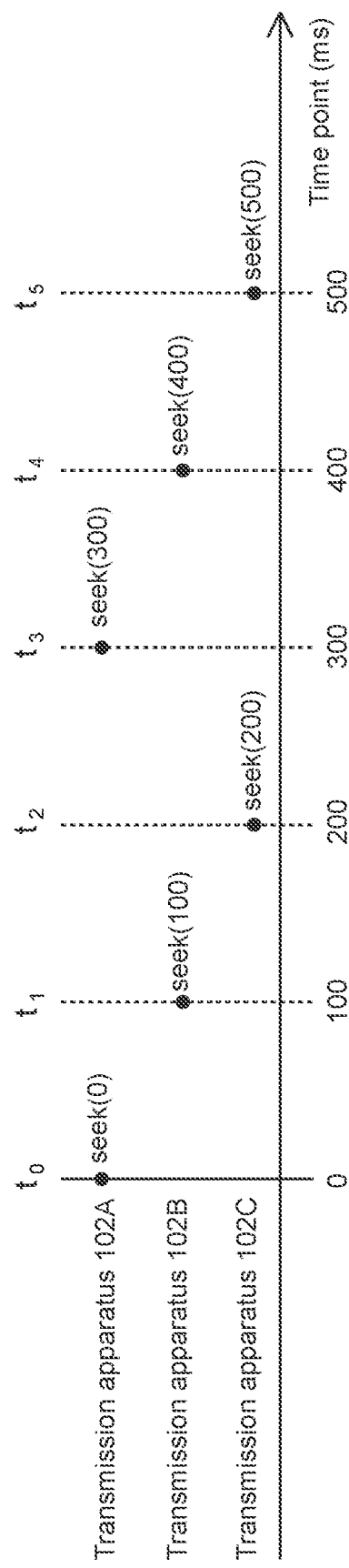
FIG. 6 An example of the trigger signals transmitted from the transmission apparatuses included in the content providing system.

FIG. 6 is a diagram schematically showing the transmission timings and the seek positions of each of the transmission apparatuses 102. Note that the content providing system 100 is assumed to include the three transmission apparatuses 102, and the three transmission apparatuses 102 are referred to as the transmission apparatus 102A, the transmission apparatus 102B, and the transmission apparatus 102C respectively.

As shown in FIG. 6, the processing part of the control apparatus 101 makes the transmission apparatus 102A transmit the trigger signal $t_0$ at the time point 0 ms, and makes the transmission apparatus 102B transmit the trigger signal $t_1$ at the time point 100 ms. Moreover, the processing part of the control apparatus 101 makes the transmission apparatus 102C transmit the trigger signal $t_2$ at the time point 200 ms, and makes the transmission apparatus 102A transmit the trigger signal $t_3$ at the time point 300 ms. Hereinafter, the trigger signals are similarly transmitted from the transmission apparatuses 102A to C in order, respectively.

The instruction showing the seek 100 ms is included in the trigger signal $t_1$, and the instruction showing the seek 200 ms is included in the trigger signal $t_2$. Similarly to the above, the same seek position as the transmission time point of the trigger signal transmitted from each of the transmission apparatuses 102 is included in each of the trigger signals.

Due to this, when the reception apparatus 103 receives the trigger signal transmitted from any one of the transmission apparatuses 102A to C, the delay in receiving the trigger signal is solved by seeking the reproduction position, and the reproduction timing of the haptic-feedback content becomes the same as the reproduction timing of the haptic-feedback content of the reception apparatus 103 that the other user wears.

Moreover, the timings at which each of the transmission apparatuses 102A to C transmits the trigger signal are not the same as each other, and as a result, the trigger signals transmitted from each of the transmission apparatuses 102A to C are prevented from interfering with each other.

Note that, the case that the three transmission apparatuses 102 are provided is described here, and similarly, in a case that the number of the transmission apparatuses 102 is not three, the transmission apparatuses 102 may transmit the trigger signals including the same seek positions as the transmission time points at different timings respectively.

[About Plurality of Haptic-Feedback Presenting Parts]

As described above, the reception apparatus 103 includes the haptic-feedback presenting part 115 that presents the haptic feedback to the user. Alternatively, in a case that the reception apparatus 103 includes the plurality of haptic-feedback presenting parts 115, operations of the haptic-feedback presenting parts 115 may be different from each other.

Figure 7:
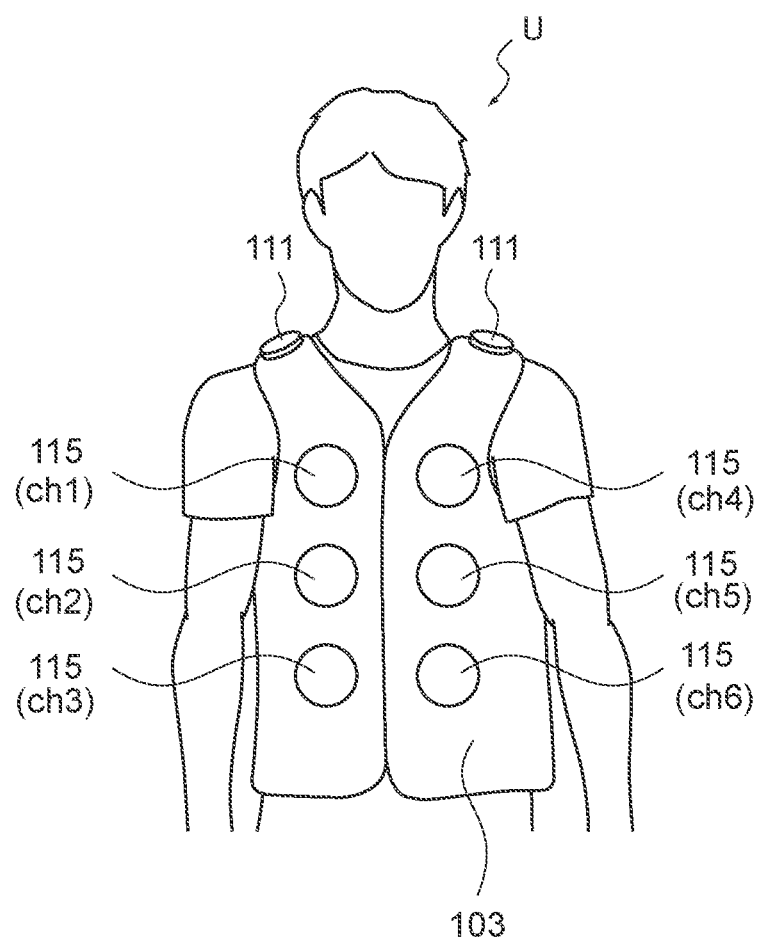
FIG. 7 A diagram schematically showing the reception apparatus included in the content providing system.
Figure 8:
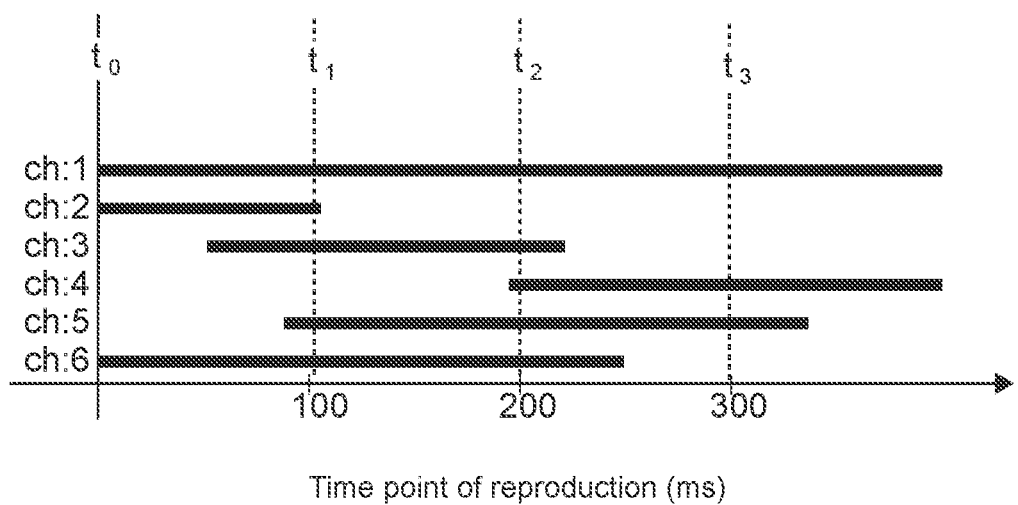
FIG. 8 An example of the haptic-feedback content stored in the reception apparatus included in the content providing system.

FIG. 7 is a diagram schematically showing operation channels of the haptic-feedback presenting parts 115. As shown in FIG. 7, the different operation channels ch1 to ch6 are set in the six haptic-feedback presenting parts 115 included in the reception apparatuses 103 respectively. FIG. 8 is an example of a haptic-feedback content stored in the storage part 113, and a graph showing reproduction time points and haptic-feedback presenting times (in FIG. 8, black lines). As shown in FIG. 8, each of operation timings of the haptic-feedback content is different in the ch1 to 6.

By transmitting trigger signals including the same seek positions as transmission time points by a processing part of the control apparatus 101 every predetermined time point (See FIG. 5), as shown in FIG. 8, each of the haptic-feedback presenting parts 115 of the ch1 to 6 presents a haptic feedback to a user from a predetermined seek position respectively.

As described above, the content providing system 100 presents the haptic-feedback content stored in the storage part 113 to the user by the trigger signals. As a result, although the number of the operation channels of the haptic-feedback presenting parts 115 is large, a load of the system is small.

If a haptic-feedback content for the plurality of haptic-feedback presenting parts 115 is transmitted from the transmission apparatus 102 to the reception apparatus 103, the amount of transmitted information may be large, and a band of a transmission signal may be insufficient. On the other hand, in the content providing system 100, the transmission apparatus 102 may transmit only the trigger signal. As a result, although each of the plurality of haptic-feedback presenting parts 115 operates differently, the reception apparatus 103 may support the user without a problem.

Note that the number of the haptic-feedback presenting parts 115 is not limited to six, and the number of operation channels is also not limited to six. The plurality of haptic-feedback presenting parts 115 may operate in one operation channel.

[About Identification by ID]

Figure 9:
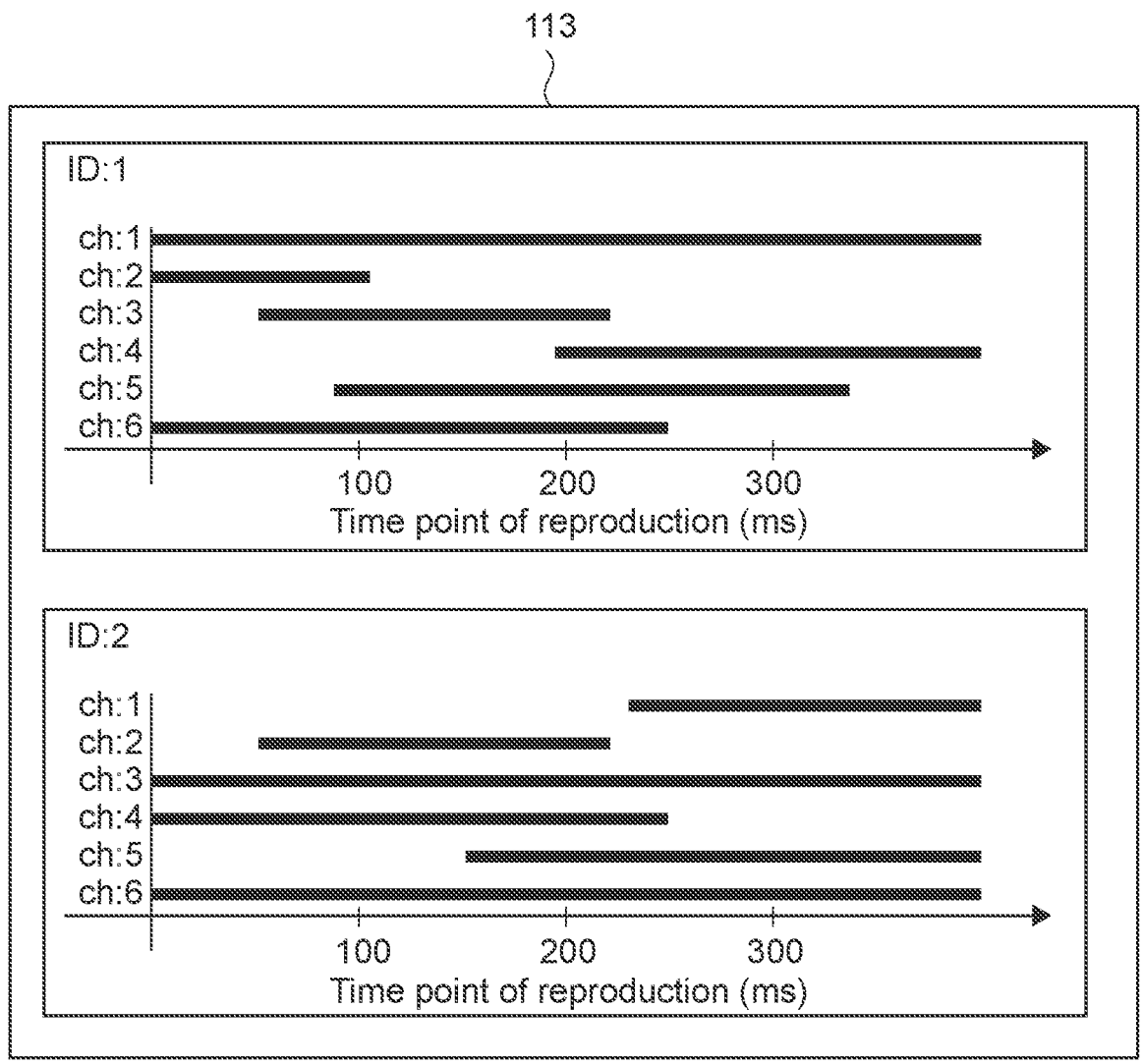
FIG. 9 An example of the haptic-feedback content stored in the reception apparatus included in the content providing system.

In the storage part 113, a plurality of haptic-feedback contents may be stored. FIG. 9 is an example of a plurality of haptic-feedback contents stored in the storage part 113. As shown in FIG. 9, the two haptic-feedback contents are stored in the storage part 113, and an ID1 and an ID2 are attached respectively.

Figure 10:
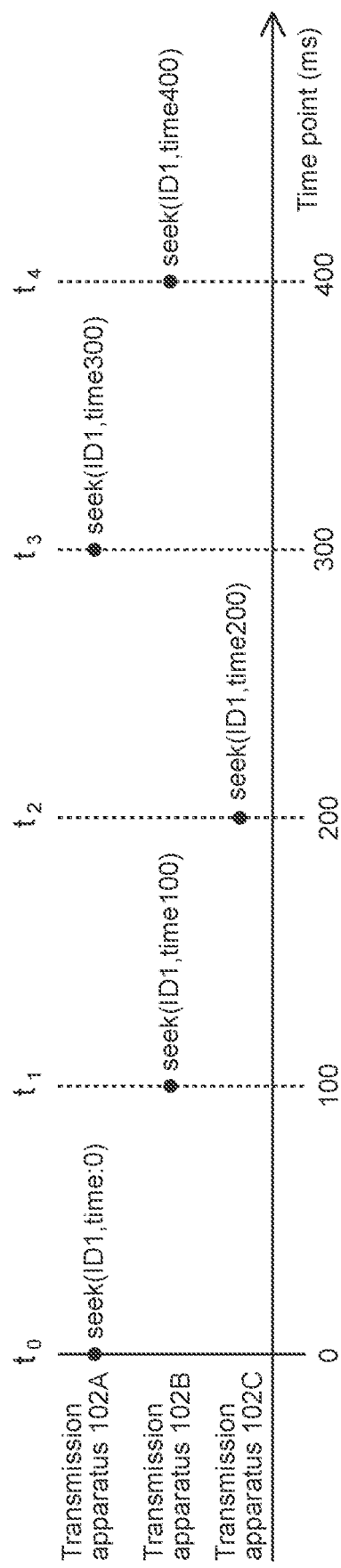
FIG. 10 An example of the trigger signals transmitted from the transmission apparatuses included in the content providing system.

FIG. 10 is a diagram schematically showing transmission timings and seek positions for each of the transmission apparatuses 102. As shown in FIG. 10, each of trigger signals transmitted from each of the transmission apparatuses 102 includes the seek position and the ID.

In the reception apparatus 103, the signal-reception part 111 receives the trigger signal, the control part 114 reads the haptic-feedback content that is specified by the ID included in the trigger signal, and controls the haptic-feedback presenting part 115 to reproduce the haptic-feedback content from the seek position included in the trigger signal.

In this manner, in the content providing system 100, the plurality of haptic-feedback contents are stored in the storage part 113, and the haptic-feedback content to be presented may be selected by using the trigger signal.

Modified Example

Figure 11:
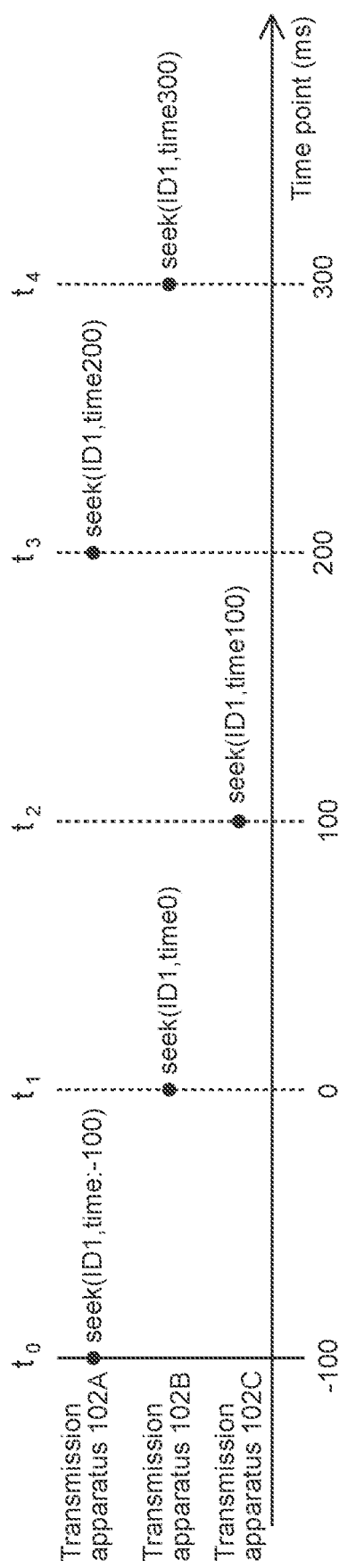
FIG. 11 An example of the trigger signals transmitted from the transmission apparatuses included in the content providing system.

The trigger signal $t_0$ transmitted first from the transmission apparatus 102 may not necessarily be the seek 0 ms. FIG. 11 is a diagram schematically showing transmission timings of trigger signals. As shown in FIG. 11, the trigger signal $t_0$ may include the seek −100 ms, that is, a seek position that is earlier than a reproduction-start time point (0 ms) of the haptic-feedback content by 100 ms.

In this case, the control part 114 starts reproduction of the haptic-feedback content 100 ms after the signal-reception part 111 receives the trigger signal $t_0$. Due to this, although the signal-reception part 111 may not receive the trigger signal $t_0$, the haptic-feedback content is reproduced at the reproduction-start time point of the haptic-feedback content (0 ms), and delay in start of reproduction by not receiving the trigger signal may be prevented, in a case that signal-reception part 111 receives the trigger signal $t_1$. The seek position of the trigger signal $t_0$ is not limited to the −100 ms, and may be the −5 min or the like.

The control part 114 may adjust a reception sensitivity of the signal-reception part 111 depending on a distance between the reception apparatus 103 and the transmission apparatus 102, that is, an intensity of the trigger signal. In a case that the distance between the reception apparatus 103 and the transmission apparatus 102 is long, the control part 114 may decrease a rate of the signal-reception part 111 to make the trigger signal reach the signal-reception part 111 surely.

The content providing system 100 may include a transmission apparatus other than the transmission apparatus 102. For example, a staff may have a support device capable of transmitting the trigger signal, and may make the device transmit the trigger signal directly to the reception apparatus 103 that may not receive the trigger signal. For example, lighting of a light-emitting part may show whether the reception apparatus 103 may receive the trigger signal or not. The light-emitting part may light while the reception apparatus 103 may receive the trigger signal, and the light-emitting part may be turned off when the reception apparatus 103 may not receive the trigger signal. Alternatively, a light color of the light-emitting part may be changed.

Moreover, the reception apparatus 103 may further include a signal-transmission part that transmits a trigger signal such as an infrared ray. The signal-reception part 111 receives the trigger signal, and then, the control part 114 may make the signal-transmission part transmit the received trigger signal to the other reception apparatus 103. Due to this, the reception apparatus 103 that may not receive the trigger signal transmitted from the transmission apparatus 102 may also receive the trigger signal transmitted from the other reception apparatus 103.

The content providing system 100 may further include a transmission apparatus that transmits a signal for stopping reproduction of the content. The transmission apparatus is provided, for example, at an exit of a room in which the content is provided, and when a user wearing the reception apparatus 103 leaves the room from the exit, the control part 114 may stop reproduction of the content. An effective period of the signal is 10 seconds, for example.

In the above description, the haptic-feedback content is assumed to be stored in the storage part 113 in advance. Alternatively, the haptic-feedback content may be stored in the storage part 113 at least by the time the trigger signal is received, and the haptic-feedback content may also be transmitted to the reception apparatus 103 via the transmission apparatus 102 or the other transmission means.

Moreover, the content that is presented to the user by the reception apparatus 103 is not limited to the haptic-feedback content, and may be content such as an image or sound. Similarly in this case, the content stored in the storage part 113 may be presented to the user according to the trigger signal transmitted from the transmission apparatus 102.

Furthermore, the trigger signal transmitted from the transmission apparatus 102 to the reception apparatus 103 is not limited to an infrared ray, and may be visible light, ultrasound, a radio wave, or the like. For example, the transmission apparatus 102 may be spotlight, and may use lighting thereof to transmit the trigger signal to the reception apparatus 103.

[Hardware Configuration]

FIG. 12 is a diagram schematically showing a hardware configuration of the control apparatus 101. As shown in FIG. 12, the control apparatus 101 includes a CPU 151, a GPU 152, a memory 153, a storage 154, and an input/output part (I/O) 155 as the hardware configuration. These are connected to each other by a bus 156. The processing part of the control apparatus 101 is realized by the CPU 151, the GPU 152, and the memory 153.

The CPU (Central Processing Unit) 151 controls the other configuration according to a program stored in the memory 153, performs data processing according to the program, and stores a processing result in the memory 153. The CPU 151 may be a microprocessor.

The GPU (Graphic Processing Unit) 152 is controlled by the CPU 151, and executes image processing. The CPU 151 is capable of causing the GPU 152 to execute parallel arithmetic processing and perform a characteristic amount of extraction at high speed. The GPU 152 may be a microprocessor.

The memory 153 stores a program and data executed by the CPU 151. The memory 153 may be an RAM (Random Access Memory).

The storage 154 stores a program and data. The storage 154 may be an HDD (hard disk drive) or an SSD (solid state drive).

The input/output part 155 receives an input to the control apparatus 101, and supplies an output from the control apparatus 101 externally. The input/output part 155 includes an input apparatus such as a keyboard or a mouse, an output apparatus such as a display, and a connection interface such as a network.

The hardware configuration of the control apparatus 101 is not limited to the configuration described above, and may be a configuration in which a functional configuration of the control apparatus 101 may be realized. Moreover, a part or all of the hardware configuration may exist in the network.

Note that the present technology may also employ the following configurations.

(1)

A content providing system, including:

a transmission apparatus transmitting a trigger signal by broadcasting the trigger signal;

a control apparatus controlling the transmission apparatus; and a plurality of reception apparatuses, each of the plurality of reception apparatuses including a signal-reception part that receives the trigger signal, a storage part that stores content, a content presenting part that presents the content to a user, and a control part that controls the content presenting part on the basis of the trigger signal.

(2)

The content providing system according to (1), in which the control apparatus controls the transmission apparatus to transmit, at a first time point, a first trigger signal for starting reproduction of the content at a first reproduction time point, and to transmit, at a second time point, a second trigger signal for starting reproduction of the content at a second reproduction time point, and a time difference between the first reproduction time point and the second reproduction time point is the same as a time difference between the first time point and the second time point.

(3)

The content providing system according to (1) or (2), in which the content is haptic-feedback content, and the control apparatus controls the transmission apparatus to provide the user with at least one of image content or sound content, and to synchronize the haptic-feedback content with at least one of the image content or the sound content.

(4)

The content providing system according to any one of (1) to (3), in which the transmission apparatus transmits the trigger signal by radiation of an electromagnetic wave.

(5)

The content providing system according to (4), in which the transmission apparatus transmits the trigger signal by radiation of an infrared ray.

(6)

The content providing system according to any one of (1) to (5), further including a plurality of transmission apparatuses, each of the plurality of transmission apparatuses transmitting the trigger signal by broadcasting the trigger signal, in which the control apparatus controls the plurality of transmission apparatuses such that the plurality of transmission apparatuses transmit the trigger signals at different time points.

(7)

The content providing system according to (6), in which the plurality of transmission apparatuses include a first transmission apparatus and a second transmission apparatus, the control apparatus controls the first transmission apparatus to transmit, at a first time point, a first trigger signal for starting reproduction of the content at a first reproduction time point, and controls the second transmission apparatus to transmit, at a second time point, a second trigger signal for starting reproduction of the content at a second reproduction time point, and a time difference between the first reproduction time point and the second reproduction time point is the same as a time difference between the first time point and the second time point.

(8)

The content providing system according to any one of (1) to (7), in which each of the plurality of reception apparatuses includes a plurality of content presenting parts, the content includes operation timings of the plurality of content presenting parts, respectively, and the control part controls the plurality of content presenting parts on the basis of the trigger signal.

(9)

A control apparatus, controlling a transmission apparatus that transmits a trigger signal by broadcasting the trigger signal to a plurality of reception apparatuses, each of the plurality of reception apparatuses including a signal-reception part that receives the trigger signal, a storage part that stores content, a content presenting part that presents the content to a user, and a control part that controls the content presenting part on the basis of the trigger signal.

(10)
A reception apparatus, including:
a signal-reception part receiving a trigger signal transmitted by broadcasting the trigger signal;
a storage part storing content;
a content presenting part presenting the content to a user; and
a control part controlling the content presenting part on the basis of the trigger signal.

REFERENCE SIGNS LIST 100 content providing system
101 control apparatus
102 transmission apparatus
103 reception apparatus
104 screen
105 projector
106 speaker
111 signal-reception part
112 signal-analysis part
113 storage part
114 control part
115 haptic-feedback presenting part

The invention claimed is:
1. A content providing system, comprising:
a transmission apparatus configured to transmit a trigger signal based on broadcast of the trigger signal;
a control apparatus configured to:
control the transmission apparatus to transmit, at a first time point, a first trigger signal to start reproduction of content at a first reproduction time point; and
control the transmission apparatus to transmit, at a second time point, a second trigger signal to start reproduction of the content at a second reproduction time point, wherein
a time difference between the first reproduction time point and the second reproduction time point is same as a time difference between the first time point and the second time point; and
a plurality of reception apparatuses, wherein each reception apparatus of the plurality of reception apparatuses comprises:
a signal-reception part configured to receive the trigger signal;
a storage part configured to store the contents;
a content presenting part configured to present the content to a user; and
a control part configured to control the content presenting part based on the trigger signal.
2. The content providing system according to claim 1, wherein
the content is haptic-feedback content, and
the control apparatus is further configured to:
control the transmission apparatus to provide at least one of image content or sound content to the user; and
control the transmission apparatus to synchronize the haptic-feedback content with at least one of the image content or the sound content.
3. The content providing system according to claim 1, wherein the transmission apparatus is further configured to transmit the trigger signal based on radiation of an electromagnetic wave.

4. The content providing system according to claim 3, wherein the transmission apparatus is further configured to transmit the trigger signal based on radiation of an infrared ray.
5. The content providing system according to claim 1, further comprising
a plurality of transmission apparatuses, wherein each transmission apparatus of the plurality of transmission apparatuses is configured to transmit the trigger signal based on broadcast of the trigger signal,
wherein the control apparatus is further configured to control the plurality of transmission apparatuses such that the plurality of transmission apparatuses is configured to transmit a plurality of trigger signals at different time points.
6. The content providing system according to claim 5, wherein
the plurality of transmission apparatuses includes a first transmission apparatus and a second transmission apparatus,
the control apparatus is further configured to:
control the first transmission apparatus to transmit, at a third time point, a third trigger signal to start reproduction of the content at a third reproduction time point; and
control the second transmission apparatus to transmit, at a fourth time point, a fourth trigger signal to start reproduction of the content at a fourth reproduction time point, and
a time difference between the third reproduction time point and the fourth reproduction time point is same as a time difference between the third time point and the fourth time point.
7. The content providing system according to claim 1, wherein
each reception apparatus of the plurality of reception apparatuses includes a plurality of content presenting parts,
the content includes operation timings of the plurality of content presenting parts, respectively, and
the control part is further configured to control the plurality of content presenting parts based on the trigger signal.
8. A control apparatus, comprising:
a Central Processing Unit (CPU) configured to:
control a transmission apparatus that transmits a trigger signal based on broadcast of the trigger signal to a plurality of reception apparatuses;
control the transmission apparatus to transmit, at a first time point, a first trigger signal to start reproduction of content at a first reproduction time point; and
control the transmission apparatus to transmit, at a second time point, a second trigger signal to start reproduction of the content at a second reproduction time point, wherein
a time difference between the first reproduction time point and the second reproduction time point is same as a time difference between the first time point and the second time point, and
each reception apparatus of the plurality of reception apparatuses comprises:
a signal-reception part that receives the trigger signal;
a storage part that stores the content;
a content presenting part that presents the content to a user; and
a control part that controls the content presenting part based on the trigger signal.

9. A reception apparatus, comprising:
a signal-reception part configured to:
   receive a trigger signal transmitted based on broadcast of the trigger signal;
   receive, at a first time point, a first trigger signal to start reproduction of content at a first reproduction time point; and
   receive, at a second time point, a second trigger signal to start reproduction of the content at a second reproduction time point, wherein
   a time difference between the first reproduction time point and the second reproduction time point is same as a time difference between the first time point and the second time point;
a storage part configured to store the content;
a content presenting part configured to present the content to a user; and
a control part configured to control the content presenting part based on the trigger signal.

10. A content providing system, comprising:
a plurality of transmission apparatuses, wherein each transmission apparatus of the plurality of transmission apparatuses is configured to transmit a trigger signal based on broadcast of the trigger signal;
a control apparatus configured to control the plurality of transmission apparatuses such that the plurality of transmission apparatuses is configured to transmit a plurality of trigger signals at different time points; and
a plurality of reception apparatuses, wherein each reception apparatus of the plurality of reception apparatuses comprises:
   a signal-reception part configured to receive the trigger signal;
   a storage part configured to store content;
   a content presenting part configured to present the content to a user; and
   a control part configured to control the content presenting part based on the trigger signal.

11. A content providing system, comprising:
a transmission apparatus configured to transmit a trigger signal based on broadcast of the trigger signal;
a control apparatus configured to control the transmission apparatus; and
a plurality of reception apparatuses, wherein each reception apparatus of the plurality of reception apparatuses comprises:
   a signal-reception part configured to receive the trigger signal;
   a storage part configured to store content;
   a plurality of content presenting parts configured to present the content to a user, wherein the content includes operation timings of the plurality of content presenting parts, respectively; and
   a control part configured to control the plurality of content presenting part based on the trigger signal.

* * * * *